H. D. GANSE.
Hand-Plow.
No. 12,589.
Patented Mar. 27, 1855.
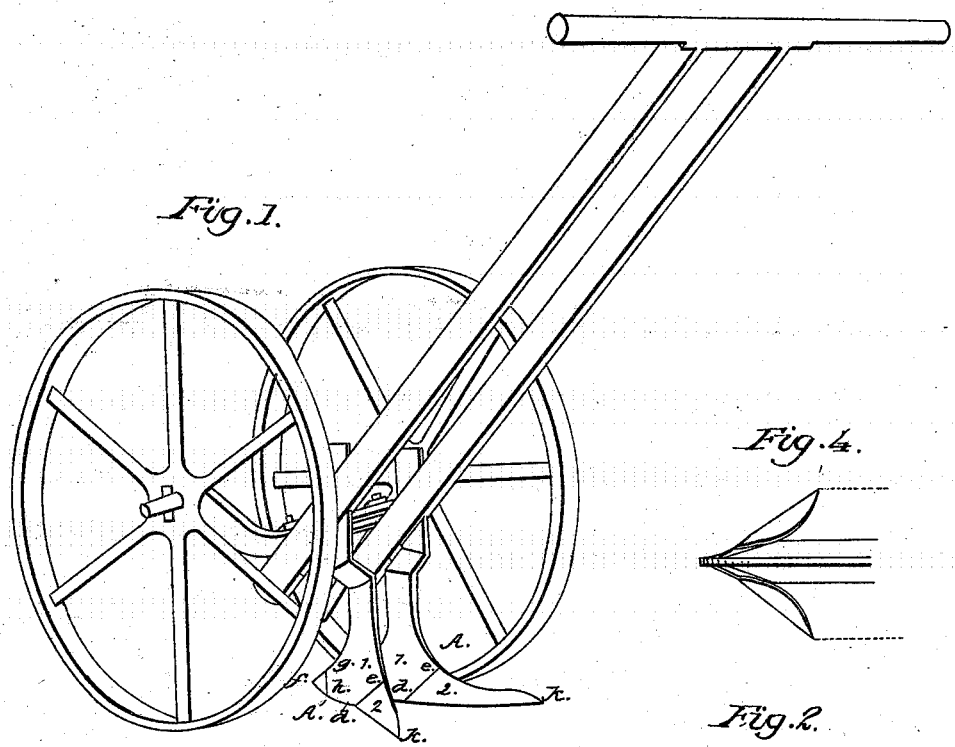
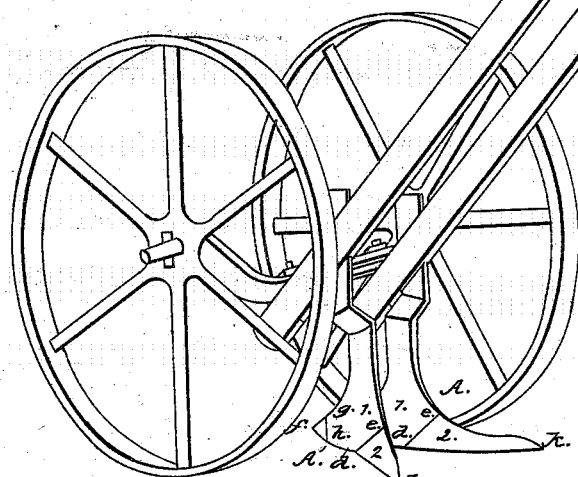
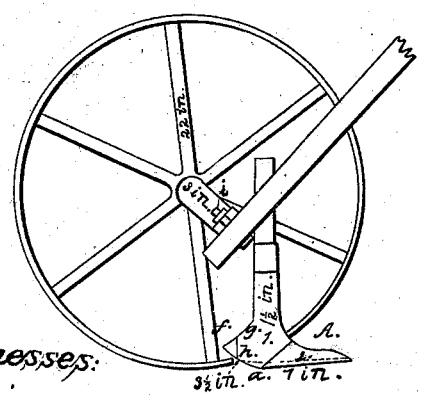
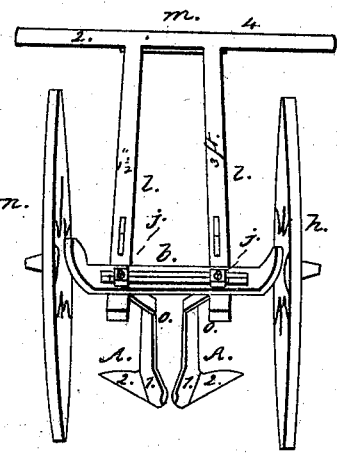
Witnesses:
Inventor:

UNITED STATES PATENT OFFICE.

HERVEY D. GANSE, OF FREEHOLD, NEW JERSEY.

IMPROVEMENT IN CULTIVATORS.

Specification forming part of Letters Patent No. 12,589, dated March 27, 1855.

*To all whom it may concern:*

Be it known that I, HERVEY D. GANSE, of the town of Freehold, in the county of Monmouth and State of New Jersey, have invented a new and useful machine for tending by hand all kinds of vegetables that are grown in rows or drills; and I do hereby declare that the following is a full, clear, and exact description of the construction and operation of the same, reference being had to the annexed amended drawings, making a part of this specification, in which—

Figure I is a perspective view; Fig. II, a front elevation, and Fig. III a longitudinal section.

A A in the several figures are two corresponding blades of steel, each of which consists of the distinct parts marked 1 2, which are united at the lines $d\ e$, Figs. I and III. These two parts may be made continuous and of a single plate. The parts 1 1 are upright, and are set opposite to each other, one or more inches apart at the lines $d\ e$, but converging toward the lines $g\ h$ at an angle of about twenty degrees. From these last-named lines, however, to the foremost points, $f f$, the parts are parallel. The lines $f d$ are cutting-edges which incline backward at an angle of about twenty-five degrees with the surface of the ground. Any angle will be proper which is acute enough to suffer incumbrances to pass off backward without choking. The parts 1 1 thus described may be called "fenders," since their chief use is to protect the young plants from being covered. To these the parts 2 2, resembling plane narrow mold-boards with a pitch of about forty degrees, are so added that the cutting-edge $d\ k$ continues the edge $f d$, already described.

The plants to be tended, while young, fall between the two blades A A, which have just been described. These blades may be set at any required distance from each other by means of the screw-bolts $i\ i$, Figs. II and III. They cut into the ground about an inch, or to the dotted line, Fig. III. As the machine is pushed forward the earth is shaved down and pressed outward by the inclined edges and the lateral flare of the fenders, and then flows over the mold-boards completely crumbled, filling again the furrows from which it has been taken. The plants, however small, are not moved or covered. Fig. IV shows the blades A A in their proper position, viewed from above. The shaded stripes show the furrows which the fenders would make alone. The outside dotted lines show the whole width of the furrows made by the combined fenders and mold-boards. This width is about five inches on each side of the plants.

As the plants grow the blades may be set deeper, or they may be exchanged, so as to throw the furrows to the plants. At any stage of the growth of the plants they may be reversed in the shafts, so as to be drawn instead of being pushed.

The shafts $l\ l$ and handle $m$, Fig. II, are of wood. The shafts are sprung to the required distances along the axle $b$. This axle, the wheels $n\ n$, and the bent shanks $c\ c$ are of cast-iron. The dimensions used are given in the drawings; but these exact dimensions are not essential.

What I claim as my invention, and desire to secure by Letters Patent, is—

1. That shape of the upright parts or fenders above described, in its application to the purposes above described, by which the foremost point of each fender is elevated to or above the surface of the ground, and the lower or cutting edge inclines backward from that point in the manner described, so as to secure the results described.

2. The combination of said fenders with the mold-boards and wheels in the manner above described, the invention of which mold-boards and wheels I do not claim.

Dated Freehold, February 8, 1855.

HERVEY D. GANSE.

Witnesses:
DAVID CLARK PERRIN,
I. MONROE WAINRIGHT.